(12) United States Patent
Li et al.

(10) Patent No.: US 8,755,339 B2
(45) Date of Patent: Jun. 17, 2014

(54) METHOD AND APPARATUS FOR GENERATING A DEDICATED REFERENCE SIGNAL

(75) Inventors: Yingyang Li, Beijing (CN); Xiaoqiang Li, Beijing (CN)

(73) Assignee: Samsung Electronics Co., Ltd (KR)

(*) Notice: Subject to any disclaimer, the term of this patent is extended or adjusted under 35 U.S.C. 154(b) by 178 days.

(21) Appl. No.: 12/819,729

(22) Filed: Jun. 21, 2010

(65) Prior Publication Data

US 2010/0322178 A1    Dec. 23, 2010

(30) Foreign Application Priority Data

Jun. 19, 2009   (CN) .......................... 2009 1 0146321

(51) Int. Cl.
*H04W 4/00*   (2009.01)
*H04J 3/06*   (2006.01)

(52) U.S. Cl.
USPC .......................................... 370/329; 370/350

(58) Field of Classification Search
None
See application file for complete search history.

(56) References Cited

U.S. PATENT DOCUMENTS

| | | | |
|---|---|---|---|
| 7,729,237 B2* | 6/2010 | Lee et al. ........................ | 370/208 |
| 7,940,643 B2* | 5/2011 | Lee et al. ........................ | 370/208 |
| 8,050,220 B2* | 11/2011 | Lee et al. ........................ | 370/328 |
| 2008/0279170 A1* | 11/2008 | Malladi et al. .................. | 370/343 |
| 2008/0316947 A1 | 12/2008 | Lindoff et al. | |
| 2009/0046645 A1* | 2/2009 | Bertrand et al. .............. | 370/329 |
| 2009/0080500 A1 | 3/2009 | Muharemovic et al. | |
| 2009/0135803 A1* | 5/2009 | Luo et al. ........................ | 370/350 |
| 2010/0002804 A1 | 1/2010 | Ogawa et al. | |
| 2010/0157924 A1* | 6/2010 | Prasad et al. ................... | 370/329 |
| 2010/0323709 A1* | 12/2010 | Nam et al. ....................... | 455/450 |
| 2011/0038344 A1* | 2/2011 | Chmiel et al. .................. | 370/330 |
| 2011/0170629 A1* | 7/2011 | Lee et al. ........................ | 375/295 |
| 2011/0200002 A1* | 8/2011 | Han et al. ........................ | 370/329 |
| 2011/0293037 A1* | 12/2011 | Liu et al. ........................ | 375/295 |
| 2012/0033630 A1* | 2/2012 | Chung et al. ................... | 370/329 |
| 2012/0176885 A1 | 7/2012 | Lee et al. | |
| 2012/0182956 A1* | 7/2012 | Liu et al. ........................ | 370/329 |
| 2012/0300718 A1* | 11/2012 | Ji et al. ........................... | 370/329 |
| 2013/0178221 A1* | 7/2013 | Jung et al. ...................... | 455/450 |

FOREIGN PATENT DOCUMENTS

| | | |
|---|---|---|
| JP | 2013-504278 | 2/2013 |
| WO | WO 2008/052026 | 5/2008 |
| WO | WO 2008/093716 | 8/2008 |
| WO | WO 2008/155380 | 12/2008 |

OTHER PUBLICATIONS

Nokia Siemens Networks, Nokia, "Considerations on Initialization and Mapping of DM-RS Sequence", R1-093304, 3GPP TSG RAN WG1 #58 Meeting, Aug. 24-28, 2009.
Nokia Siemens Networks, Nokia, "Considerations on Initialization and Mapping of DM-RS Sequence", R1-093890, 3GPP TSG RAN WG1 #58bis Meeting, Oct. 12-16, 2009.

(Continued)

*Primary Examiner* — Gregory Sefcheck
(74) *Attorney, Agent, or Firm* — The Farrell Law Firm, P.C.

(57) ABSTRACT

A method for generating a Dedicated Reference Signal (DRS) is provided, which includes generating a Reference Signal (RS) sequence of each antenna port, spreading each RS sequence and obtaining an spread RS sequence, multiplying each spread RS sequence by a predefined scrambling code and obtaining a desired DRS sequence. An apparatus for generating a DRS is also provided. The problem of the imbalance of the power of OFDM symbols is cured, and DRS interference between different cells can be randomized.

6 Claims, 9 Drawing Sheets

(56) References Cited

OTHER PUBLICATIONS

Huawei, "Considerations on DMRS Sequence Design", R1-094342, 3GPP TSG RAN WG1 Meeting #58bis, Oct. 12-16, 2009.
Motorola, "Further Considerations for Supporting Dual-Layer Beamforming in LTE Rel-9", R1-093954, 3GPP TSG RAN WG1 #58bis, Oct. 12-16, 2009.
ZTE, "Cell-Specific Frequency Shift for UE Specific RS", R1-082376, 3GPP TSG RAN WG1 Meeting #53bis, Jun. 30-Jul. 4, 2008.
Ericsson, "Update of Uplink Reference-Signal Hopping, Downlink Reference-Signals, Scrambling Sequences, DwPTS/UpPTS Lengths for TDD and Control Channel Processing", R1-081155, 3GPP TSG-RAN WG1 Meeting #52, Feb. 11-15, 2008.

* cited by examiner

FIG. 1
PRIOR ART

PDCCH  CRS

Data DRS

FIG. 9

METHOD AND APPARATUS FOR GENERATING A DEDICATED REFERENCE SIGNAL

PRIORITY

This application claims priority under 35 U.S.C. §119(a) to an application filed in the Chinese Patent Office on Jun. 19, 2009 and assigned Serial No. 200910146321.1, the contents of which are incorporated herein by reference.

BACKGROUND OF THE INVENTION

1. Field of the Invention

The present invention relates generally to radio communication technologies, and more particularly, to a method and apparatus for generating a Dedicated Reference Signal (DRS) in a radio communication system.

2. Description of the Related Art

In an Advanced Long Term Evolution (LTE-A) system, 8 transmitting antennae are configured for each cell to support a higher peak rate. In order to decrease the overhead of Reference Signals (RS), a DRS is used to demodulate downlink data. A base station sends a DRS for each stream of data of each User Equipment (UE). Most UEs in a cell adopt a low rank transmission mode, wherein the value of the rank is equal to the number of streams simultaneously transmitted by the UE. As such, the number of DRSs actually transmitted by each UE is small, thereby decreasing the overhead of reference signals. In addition, the use of the DRS is convenient for Coordinated Multi-Point (CoMP) transmission and Multi-User Multiple-Input Multiple-Output (MU-MIMO) transmission.

In the LTE-A system, the CoMP transmission is mainly used for improving the average throughput of a cell and the throughput of a cell boundary, and includes two specific implementation modes, i.e. coordinated scheduling and coordinated multi-point joint transmission. For the coordinated scheduling, data of one UE only comes from one transmitting node, i.e. one serving cell. Data transmitted by other nodes is received as interference, and thus multiple nodes need coordinated scheduling to control an interference level. For the coordinated multi-point joint transmission, multiple nodes may transmit data to one UE by using the same time-frequency resources, thereby increasing the signal-to-noise ratio of the UE and decreasing the interference. Based on a DRS, the LTE-A system may support transparent coordinated multi-point joint transmission. The UE only receives data of a Physical Downlink Control CHannel (PDCCH) transmitted by one node, and the node is a serving cell of the UE. At the same time, data transmission is based on the DRS, and the UE receives the DRS, performs channel evaluation and demodulates the data, but does not consider which nodes transmit the data.

In addition, since MU-MIMO is adopted in the LTE-A system, data of multiple UEs can be transmitted by using the same time-frequency resources. The MU-MIMO has also been supported in a Long Term Evolution (LTE) system. However, MU-MIMO in the LTE solution is defined based on Single-User MIMO (SU-MIMO), which limits performance gain. In the LTE-A system, the MU-MIMO is to be optimized, by providing scheduling information of other UEs performing MU-MIMO with one UE, so that the UE can report more accurate Channel Quality Indicator (CQI) information, and remove interference as much as possible when demodulating data. For MU-MIMO based on a DRS, a base station is configured such that multiple UE performing MU-MIMO adopt different DRS patterns that preferably are orthogonal, to obtain a better channel evaluation performance.

Figure 1:
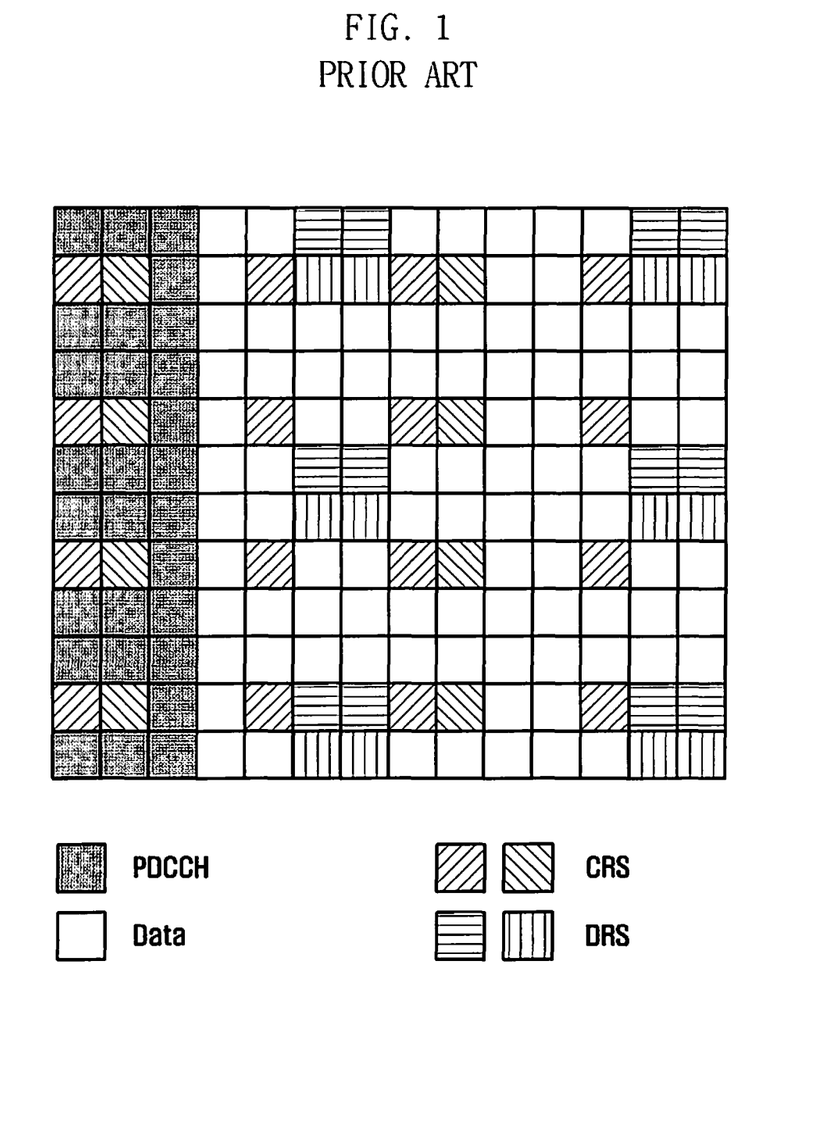
FIG. 1 illustrates a conventional DRS structure.

FIG. 1 illustrates a conventional DRS structure. A Code Division Multiplexing (CDM) and Frequency Division Multiplexing (FDM) mode is adopted, i.e. the Resource Elements (RE) for transmitting DRSs are divided into two groups by using a FDM mode, and DRSs of multiple data streams are multiplexed in each RE group by using a CDM mode. Hereinafter, each group of REs will be referred to as a CDM RE group.

Figure 2:
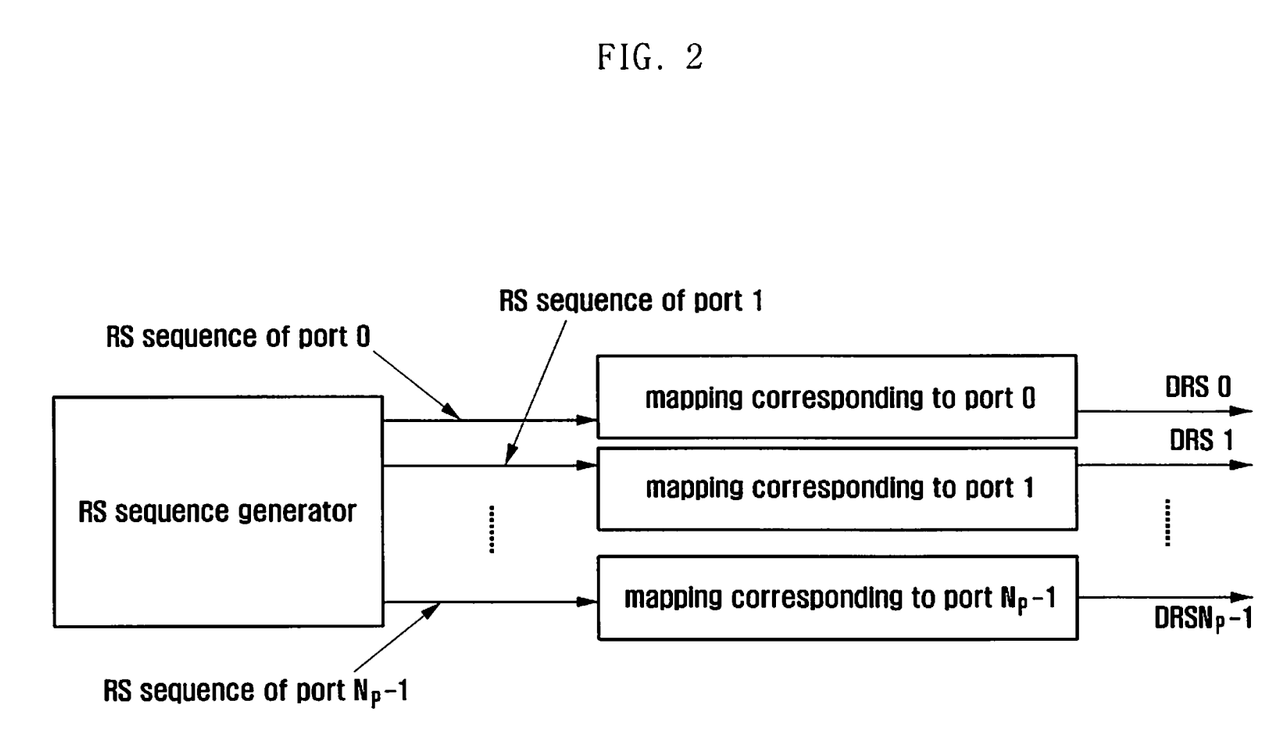
FIG. 2 illustrates a conventional method for generating and mapping a DRS.

FIG. 2 illustrates a conventional method for generating and mapping a DRS. As shown in FIG. 2, an RS sequence of each antenna port, i.e. a DRS sequence, is generated, and then RE mapping is performed for the RS sequence. There are three methods for generating the RS sequence. In the first method, one random sequence is generated for each antenna port by using different initialization values, and then the RS sequence is generated according to the random sequence. In the second method, one random sequence is generated by using one initialization value, one long scrambling sequence is generated according to the random sequence, and the long to scrambling sequence is divided into multiple subsections and the RS sequence of each antenna port is obtained. In the third method, one random sequence is generated by using one initialization value, then one scrambling code sequence is generated according to the random sequence, and each antenna port uses the scrambling code sequence as the RS sequence.

Figure 3:
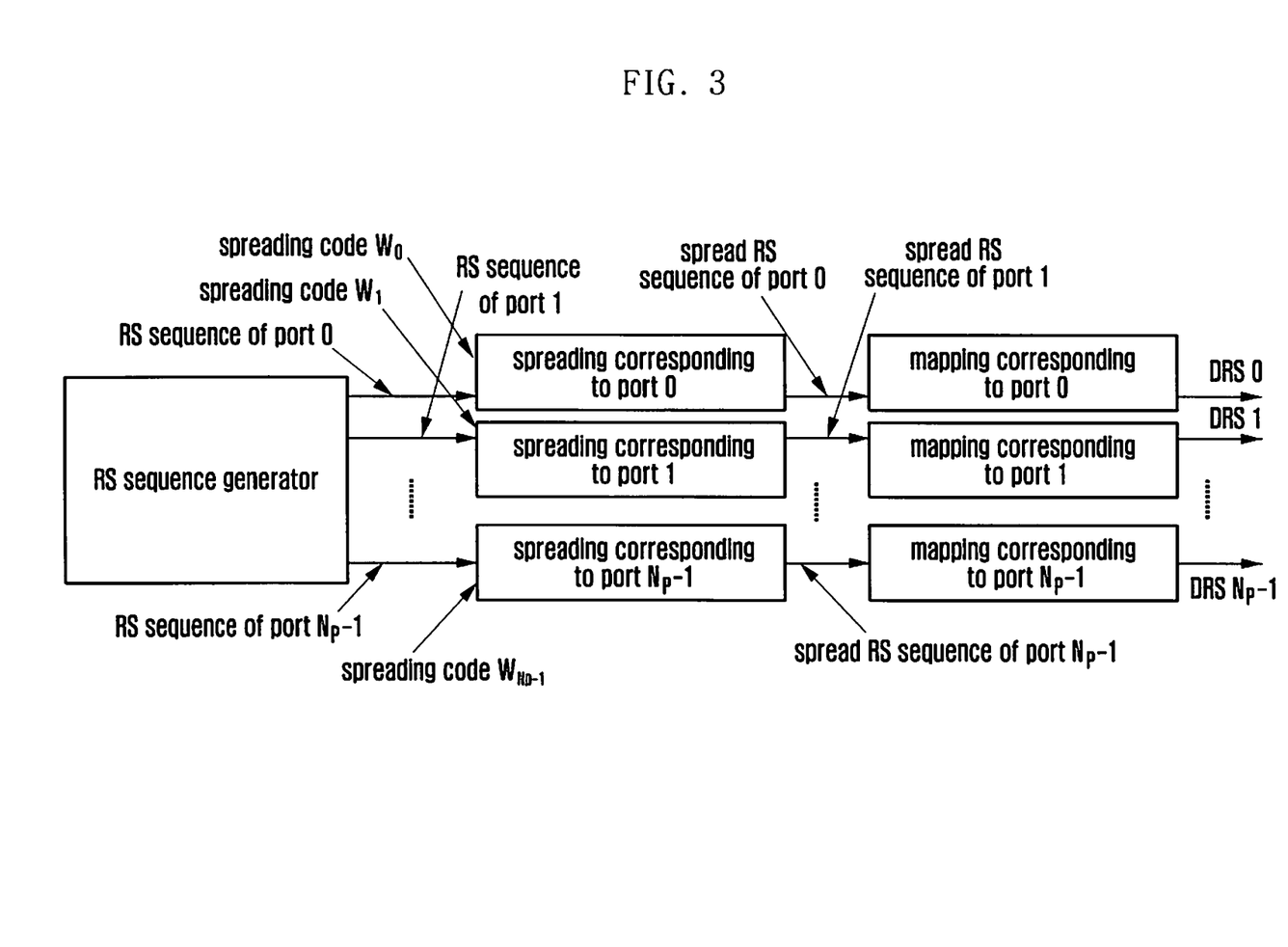
FIG. 3 illustrates another method for generating and mapping a DRS in the prior art.

For a DRS structure using the CDM mode or a DRS structure jointly using the CDM mode and other multiplexing modes, the step of generating the RS sequence shown in FIG. 2 can be described in detail, e.g. a method for generating and mapping a DRS shown in FIG. 3. As shown in FIG. 3, an RS sequence of each antenna port is generated, then each element of each RS sequence is spread to obtain an spread RS sequence, where an spreading code may be a Walsh code, and RE mapping is performed for the spread RS sequence.

For the method shown in FIG. 3, if RS sequences of all antenna ports are identical, when DRSs of multiple data streams are transmitted by using the CDM mode, it is possible for DRSs on one OFDM symbol to adopt double transmission power and DRSs on the other OFDM symbol to have no transmission power, thereby influencing total power for data transmission. If the RS sequences of all antenna ports are independent from each other, an imbalance of transmission power of DRSs is not a problem. However, the method shown in FIG. 3 cannot restrain DRS interference between different cells. Generally, the smaller the interference, the better the performance, but the method shown in FIG. 3 results in the interference fixedly coming from a certain cell or UE.

SUMMARY OF THE INVENTION

In view of the above, an object of the present invention is to provide a method and apparatus for generating a DRS, which can randomize DRS interference between different cells.

In order to achieve the above objects, a method for generating a DRS includes generating an RS sequence of each antenna port, spreading each RS sequence and obtaining an spread RS sequence, and multiplying each spread RS sequence by a predefined scrambling code and obtaining a desired DRS sequence.

Generating the RS sequence of each antenna port includes determining an initialization parameter for generating the RS sequence, calculating an initialization value according to the initialization parameter, and generating the RS sequence of each antenna port according to the initialization value.

Multiplying each spread RS sequence by a predefined scrambling code includes determining an initialization parameter for generating the scrambling code, calculating an initialization value according to the initialization parameter, generating a common scrambling code unrelated to the antenna port, multiplying each spread RS sequence by the common scrambling code, and determining an initialization parameter for generating the scrambling code, calculating an initialization value according to the initialization parameter, generating N scrambling codes according to the initialization value, and multiplying each spread RS sequence by a scrambling code corresponding to the spread RS sequence, where N is a positive integer and is equal to the number of Code Division Multiplexing Resource Element (CDM RE) groups for transmitting the DRS.

The initialization value for generating the RS sequence is the same as or is different from the initialization value for generating the scrambling code.

When the UE does not adopt a MU-MIMO transmission mode, or adopts an implicit MU-MIMO transmission mode, an identity of the antenna port (port IDentifier (ID)), an identity of a cell in which the UE is located (cell ID), an identity of the UE (UE ID), and/or a time slot number of a time slot in which the DRS sequence is located are used as the initialization parameter.

When the UE adopts an explicit single-cell MU-MIMO transmission mode, the port ID, the cell ID, and/or the time slot number are used as the initialization parameter. When the UE adopts a Coordinated Multi-Point (CoMP) transmission mode and the explicit MU-MIMO transmission mode, the port ID, the time slot number, a predefined CoMP region ID, and/or a system frame number are used as the initialization parameter.

The port ID is used as the initialization parameter for generating the RS sequence, and indexes of the CDM RE groups are further used as the initialization parameter in a mode for generating the N scrambling codes.

Spreading each RS sequence includes multiplying each RS sequence by a spreading code, and using a predefined spreading code by hopping of each antenna port. Using a predefined spreading code by hopping of each antenna port includes changing the spreading code by taking a Physical Resource Block (PRB) as a unit, or changing the spreading code by taking a smallest CDM RE group as a unit.

The method further includes generating, for each antenna port, respective DRS sequences for all PRBs allocated to the UE, using indexes of the PRBs or values transformed from the indexes of the PRBs as initialization parameters for generating the RS sequence, combining the DRS sequences respectively corresponding to the PRBs, and obtaining the desired DRS sequence.

Also included is generating, for each antenna port, an initial DRS sequence, intercepting segments from the initial DRS sequence according to indexes of all PRBs allocated to UE or values transformed from the indexes of the PRBs, combining the intercepted segments, and obtaining the desired DRS sequence.

Further included is generating a DRS sequence for each antenna port, the length of the generated DRS sequence being equal to the length of a DRS sequence in a PRB, and the generated DRS sequence is unrelated to all PRBs allocated to UE, and using the generated DRS sequence as DRS sequences respectively corresponding to the PRBs, combining the DRS sequences respectively corresponding to the PRBs, and obtaining the desired DRS sequence.

The segments are intercepted according to an index of a PRB in each time slot of each subframe or according to a value transformed from the index of the PRB.

An apparatus for generating a DRS includes a generating unit, adapted to generate an RS sequence of each antenna port, and a spreading unit, adapted to spread each RS sequence, obtain a spread RS sequence, multiply each spread RS sequence by a predefined scrambling code, and obtain a desired DRS sequence.

The generating unit includes a calculating sub-unit, adapted to determine an initialization parameter for generating the RS sequence, and to calculate an initialization value according to the initialization parameter, and a generating sub-unit, adapted to generate the RS sequence of each antenna port according to the initialization value.

The spreading unit includes a first spreading sub-unit, adapted to multiply each RS sequence by a spreading code, and perform hopping of each antenna port using a predefined spreading code, and a second spreading sub-unit, adapted to determine an initialization parameter for generating the scrambling code, calculate an initialization value according to the initialization parameter, generate a common scrambling code unrelated to the antenna port according to the initialization value, and multiply each spread RS sequence by the common scrambling code.

The spreading unit further includes a first spreading sub-unit, adapted to multiply each RS sequence by an spreading code, and to perform hopping of each antenna port using a predefined spreading code, and a second spreading sub-unit, adapted to determine an initialization parameter for generating the scrambling code, calculate an initialization value according to the initialization parameter, generate N scrambling codes according to the initialization value, and multiply each spread RS sequence by a scrambling code corresponding the spread RS sequence, where N is a positive integer and is equal to the number of CDM RE) groups for transmitting the DRS.

The apparatus further includes a mapping unit, adapted to perform RE mapping for each desired DRS sequence.

Accordingly, in the present invention, after the spread RS sequence is obtained, the spread RS sequence is multiplied by a predefined scrambling code, a specific format of the scrambling code can be configured according to requirements, and thus not only the problem that the power of OFDM symbols is unbalanced can be solved, but also, DRS interference between different cells can be randomized. In addition, the present invention optimizes the performance of MU-MIMO, and allows the UE to learn DRS sequence information of other UEs performing MU-MIMO, thereby supporting an explicit MU-MIMO transmission mode.

DETAILED DESCRIPTION OF EMBODIMENTS OF THE INVENTION

Hereinafter, embodiments of the present invention are described in detail with reference to the accompanying drawings. The same reference numbers are used throughout the drawings to refer to the same or similar parts. Detailed descriptions of well-known functions and structures incorporated herein may be omitted for the sake of clarity and conciseness.

In order to solve the problems occurring in the prior art, the present invention provides a new method for generating and mapping a DRS, which includes generating a RS sequence of each antenna port, spreading each RS sequence and obtaining an spread RS sequence, multiplying each spread RS sequence by a predefined scrambling code and obtaining a desired DRS sequence, and performing RE mapping for each DRS sequence.

Figure 4:
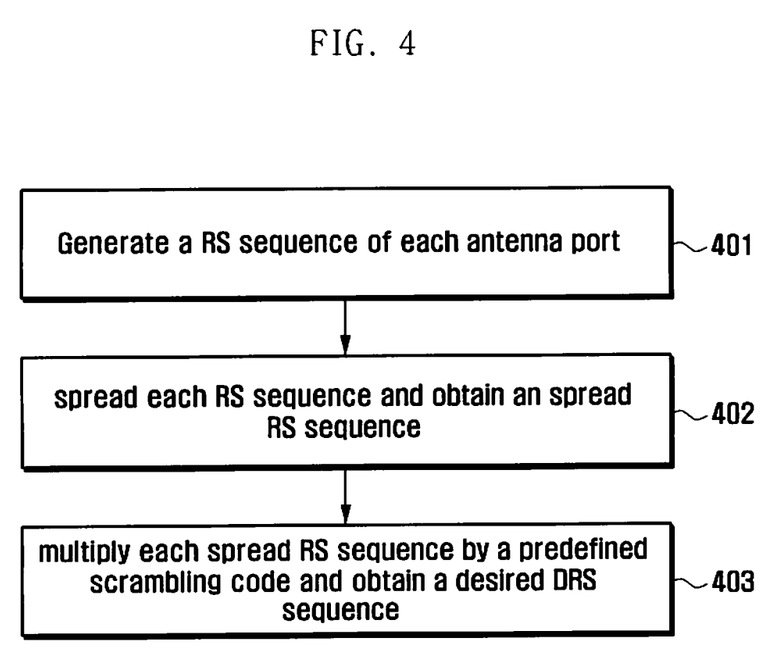
FIG. 4 illustrates a method for generating a DRS according to an embodiment of the present invention.

For a DRS structure using a CDM mode or a DRS structure jointly using a CDM mode and other multiplexing modes such as a FDM mode, FIG. 4 illustrates a method for generating a DRS according to an embodiment of the present invention. As shown in FIG. 4, the method includes the following steps.

In step 401, an RS sequence of each antenna port is generated. In this step, an initialization parameter for generating the RS sequence is determined, an initialization value is calculated according to the initialization parameter, and the RS sequence of each antenna port is generated according to the initialization value.

The above-mentioned initialization parameter may include an identity of the antenna port (port ID), an identity of a cell in which UE is located (cell ID), an identity of the UE (UE ID), and a time slot number of a time slot in which a DRS sequence is located. A specific method for generating the DRS is described by an example.

Suppose the initialization parameter is a cell ID $N_{ID}^{cell}$, a time slot number $n_s$ and a UE ID $n_{RNTI}$, the method for calculating an initialization value $c_{init}$ is $c_{init} = (\lfloor n_s/2 \rfloor + 1) \cdot (2N_{ID}^{cell} + 1) \cdot 2^{16} + n_{RNTI}$, a RS sequence generator is initialized according to the initialization value $c_{init}$, and the RS sequence of each antenna port is generated. In addition, when initialization values are calculated according to initialization parameters, it should be ensured as much as possible that initialization values are different, and independent pseudo-random sequences are generated according to the different initialization values, i.e. RS sequences of all antennae ports are independent from each other, thereby avoiding an unbalanced transmission power of DRSs on OFDM symbols In step 402, each RS sequence is spread and an spread RS sequence is obtained. In this step, each RS sequence is multiplied by a spreading code, which is preferably a Walsh code. In order to randomize DRS interference between adjacent cells, the Walsh code may be hopped in the RS sequence corresponding to each antenna port. Multiple antenna ports in the same cell obtains RS sequences by cyclic shift of the same Walsh code hopping sequence, so as to implement the orthogonal interaction of DRS sequences of data streams in the cell. Different cells adopt different hopping patterns, so as to implement interference balance. Each group of DRSs using the CDM mode may repeatedly use the same Walsh hopping sequence or use different Walsh hopping sequences.

When a hopping sequence is defined, the Walsh code may be changed by taking a Physical Resource Block (PRB) or the smallest CDM RE group as a unit. When a Walsh code with the length of 2 is adopted, the smallest RE group includes 2 REs, and when a Walsh code with the length of 4 is adopted, the smallest RE group includes 4 REs. As an example of hopping, each antenna port fixedly adopts one Walsh code, but different cells adopt different mapping relations between Walsh codes and antenna ports. The mapping relations between Walsh codes and antenna ports may be determined by a cell ID, a time slot number and an index of a CDM RE group, e.g. to $\text{mod}(cell\_ID+p, L_w)$ or $\text{mod}(cell\_ID+g+p, L_w)$, where p is an index of an antenna port, g is an index of a CDM RE group and $L_w$ is the length of a Walsh code.

In addition, according to the difference of transmission modes adopted by the UE, initialization parameters adopted when the spreading code is generated are different. Herein, the transmission modes adopted by the UE include a single-cell transmission mode not adopting MU-MIMO, a CoMP transmission mode not adopting MU-MIMO, an implicit single-cell MU-MIMO transmission mode, a CoMP and implicit MU-MIMO transmission mode, an explicit single-cell MU-MIMO transmission mode, and a CoMP and explicit MU-MIMO transmission mode.

In the two transmission modes not adopting MU-MIMO, since different cells need to adopt different Walsh hopping patterns to randomize DRS interference, the cell ID may be used as the initialization parameter, but the UE ID generally cannot be used as the initialization parameter, otherwise the UE cannot learn DRS sequences of other UEs performing MU-MIMO. This is because the UE generally does not learn IDs of other UEs performing the MU-MIMO and requires a large overhead to dynamically transmit this information. In the CoMP and explicit MU-MIMO transmission mode, the cell ID cannot be used as the initialization parameter, because the UE will not learn DRS sequences of other UEs performing the MU-MIMO. This is because the UE generally does not learn cell IDs of cells in which other UEs performing the MU-MIMO are located, and the UE requires a large overhead to transmit this information.

In step 403, each spread RS sequence is multiplied by a predefined scrambling code and a desired DRS sequence is obtained.

In this step, an initialization parameter for generating the scrambling code is determined, an initialization value is calculated according to the initialization parameter, the scrambling code is generated according to the initialization value, and each spread result is multiplied by the scrambling code, i.e. the spread RS sequence is scrambled. The length of the scrambling code is $L_{RS} \times L_w$, where $L_{RS}$ represents the length of the RS sequence, and $L_w$ represents the length of the spreading code. When the initialization values are calculated according to initialization parameters, it should be ensured as much as possible that initialization values are different, so as to generate independent pseudo-random sequences according to the different initialization values.

Figure 5:
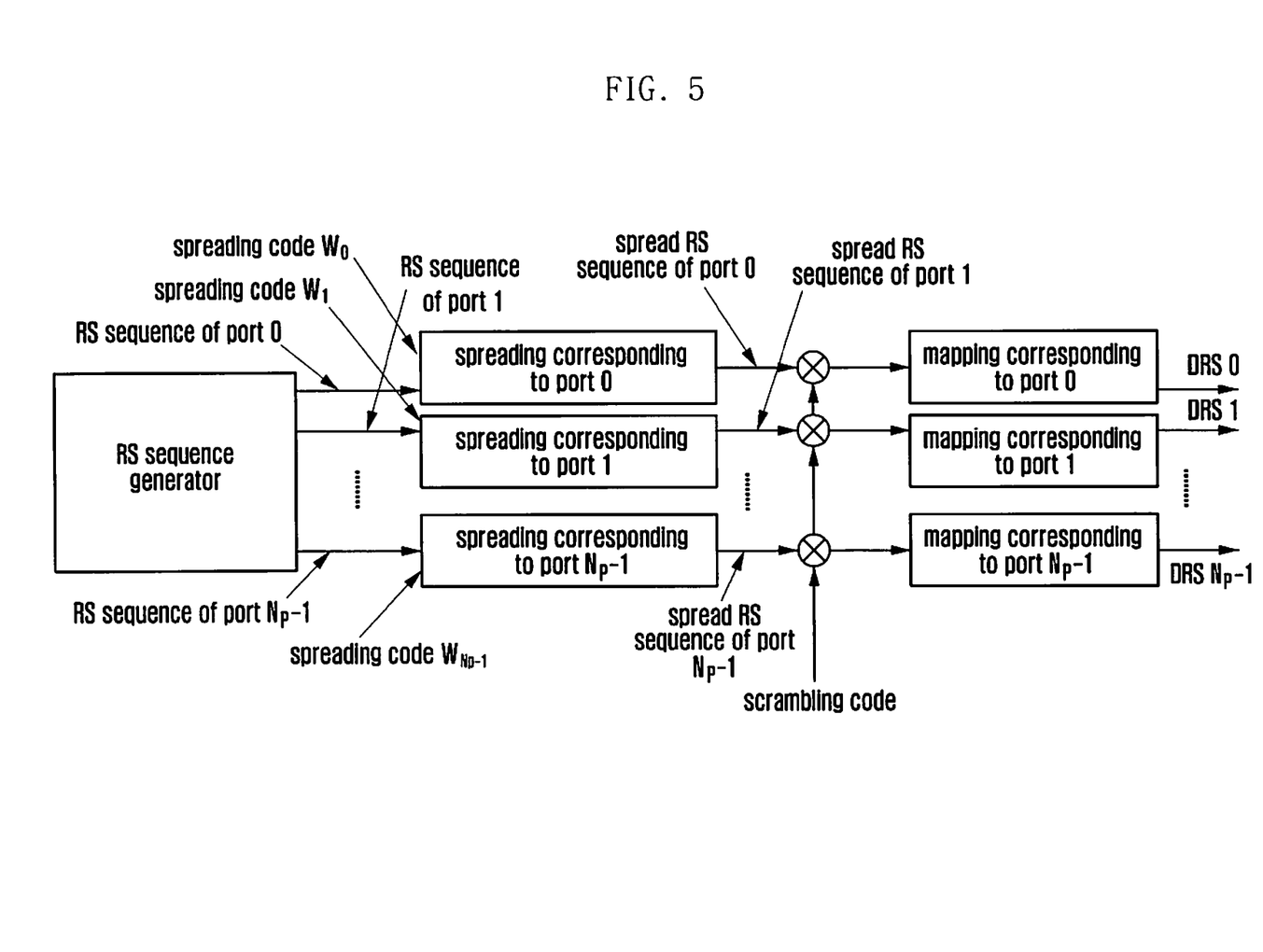
FIG. 5 illustrates an implementation in which one scrambling code is used according to an embodiment of the present invention.

In practical applications, all RS sequences may adopt the same scrambling code, i.e. each RS sequence is multiplied by a common scrambling code unrelated to an antenna port, as shown in FIG. 5.

FIG. 5 illustrates a method in which one scrambling code is used according to an embodiment of the present invention. The method is adapted to a DRS structure using a CDM mode and a DRS structure jointly using a CDM mode and other multiplexing modes. The method both can solve the problem of the imbalance of the power of OFDM symbols and can randomize the DRS interference between different cells.

Suppose the REs for transmitting DRSs are divided into N groups according to a Frequency Division Multiplexing (FDM) mode or a Time Division Multiplexing (TDM) mode, where N is generally equal to 2, and DRSs of multiple antenna ports are multiplexed by using a CDM mode in each CDM RE group. Two different scrambling codes can be used for RS sequences corresponding to antenna ports respectively belonging to two different CDM RE groups, so as to further randomize the DRS interference between cells, as shown in FIG. 6.

Figure 6:
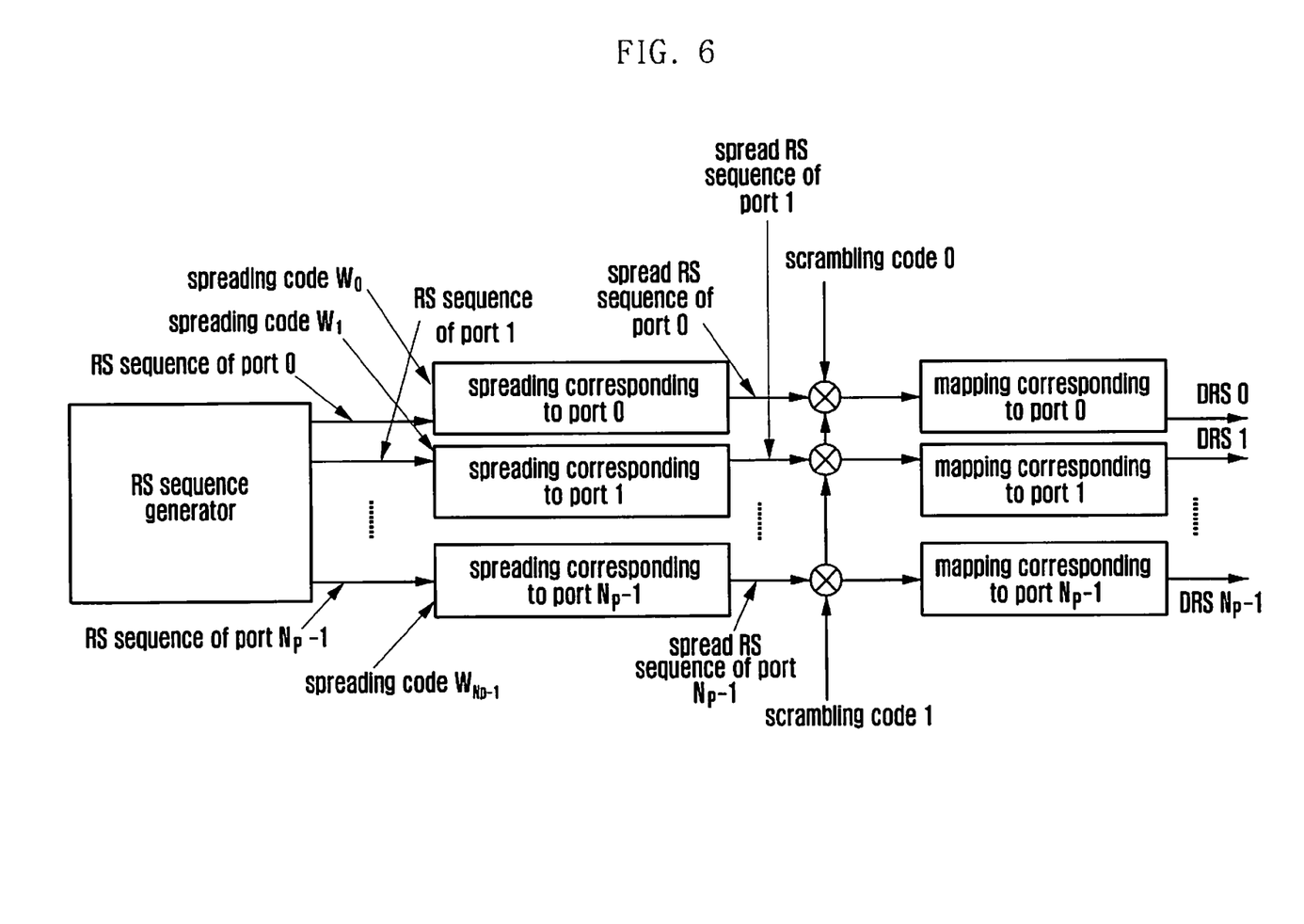
FIG. 6 illustrates an implementation in which two scrambling code are used according to an embodiment of the present invention.

FIG. 6 illustrates a method in which two scrambling code are used according to an embodiment of the present invention.

In practical applications, the initialization parameter for generating the scrambling code may be the same as or different from the initialization parameter for to generating the RS sequence in Step 401 of FIG. 4. Generally, the initialization parameter for generating the RS sequence may be for example the port ID, the cell ID, the UE ID, or the time slot number, and the initialization parameter for generating the scrambling code may be the cell ID, the UE ID and the time slot number except the port ID. In addition, in the method shown in FIG. 6, an index of a CDM RE group may also be used as the initialization parameter for generating the scrambling code.

It is noted that step 403 in FIG. 4 is optional. If step 403 is not performed, the interference balance between cells can be implemented by the hopping of the spreading code in step 402. A base station may use one bit of information to inform the UE whether this step is performed, and the one bit of information may be transmitted to the UE through a Packet Data Control CHannel (PDCCH) or through upper signalings. In addition, the one bit of information may also be bound with a transmission mode, e.g. step 403 is not performed in the CoMP and explicit MU-MIMO transmission mode and step 403 is performed in other transmission modes.

In practical applications, according to different transmission modes used by the UE, different information will be used as the initialization parameter.

It is noted that the following embodiments can be used for a DRS structure using any one multiplexing mode, which includes a FDM mode, a TDM mode, a CDM mode and any combination thereof, and for any one method for generating the DRS, and is not limited to the method for generating the DRS provided by the present invention according to the DRS structure using the CDM mode or the DRS structure jointly using the CDM mode and other multiplexing modes. In the method shown in FIG. 2, the initialization parameter usually refers to an initialization parameter for generating the RS sequence. In the method shown in FIG. 3, the initialization parameter also refers to an initialization parameter for generating the RS sequence. In the method shown in FIG. 4, the rule for determining the initialization parameter is adapted to both the method for generating the RS sequence and the method for generating the scrambling code.

In the single-cell transmission mode not adopting MU-MIMO and the CoMP transmission mode not adopting MU-MIMO, the port ID, the cell ID, the UE ID and the time slot number can be used as the initialization parameter.

In the implicit single-cell MU-MIMO transmission mode and the CoMP and implicit MU-MIMO transmission mode, the port ID, the cell ID, the UE ID and the time slot number can be used as the initialization parameter.

In the two explicit MU-MIMO transmission modes, the UE needs to learn DRSs of other UEs performing MU-MIMO, so as to restrain the interference of other UEs on the UE. In the two transmission modes, the selection of the initialization parameter will be somewhat limited.

In the explicit single-cell MU-MIMO transmission mode, the UE ID generally is not used as the initialization parameter, since the UE generally does not learn IDs of other UEs performing MU-MIMO and requires a large overhead to dynamically transmit this information. Other information except the UE ID can be used as the initialization parameter.

In the CoMP and explicit MU-MIMO transmission mode, besides the UE ID, the cell ID is not used as the initialization parameter, since one base station may simultaneously transmit data in one PRB to multiple UE belonging to multiple cells, but the UE generally does not learn cell IDs of cells in which other UEs performing MU-MIMO is located and requires a large overhead to transmit this information. Other information except the UE ID and the cell ID can be used as the initialization parameter.

In the CoMP and explicit MU-MIMO transmission mode, in order to improve the performance of the randomization of the DRS interference between cells, a CoMP region ID can be defined, and is used as the initialization parameter. The definition of the CoMP region ID is well known in the art and will be omitted herein for conciseness. In addition, a System Frame Number (SFN) may also be used as the initialization parameter, so as to further randomize the DRS interference.

In the explicit single-cell MU-MIMO transmission mode and the CoMP and explicit MU-MIMO transmission mode, in order to improve the receiving performance of MU-MIMO, the UE needs to learn DRS information of other UEss performing MU-MIMO. Specifically, if downlink resources are allocated by taking a PRB as a unit, the UE needs to learn DRS sequences used for other MU-MIMO UEs on each PRB allocated to the UE by the base station, so as to evaluate equivalent channels of other UEss and remove interference.

Since PRBs allocated to two or more UEs performing MU-MIMO may be partly overlapped, in order to guarantee that the UE can learn the DRS sequences used by other UEs performing MU-MIMO when the RS sequence is generated, the present invention points out that an index of the PRB allocated to the UE by the base station needs to be used when the DRS sequence of the UE is generated. Here, the index of the PRB can be directly used for generating the DRS sequence, or a value transformed from the index of the PRB is used for generating the DRS sequence. Herein, a transforming principle is to guarantee that the same value is obtained after indexes of PRBs with the same frequency location are transformed. For example, in the CoMP and explicit MU-MIMO transmission mode, downlink bandwidth of multiple cells performing CoMP transmission may be different, so the indexes of PRBs with the same frequency location in two cells may be different, but it is ensured that the same value is obtained after the indexes of the PRBs with the same frequency location are transformed, thereby ensuring that the UE can learn the DRS sequences used by other UEs performing MU-MIMO.

The following processing modes can be used to implement the present invention.

The First Mode

Figure 7:
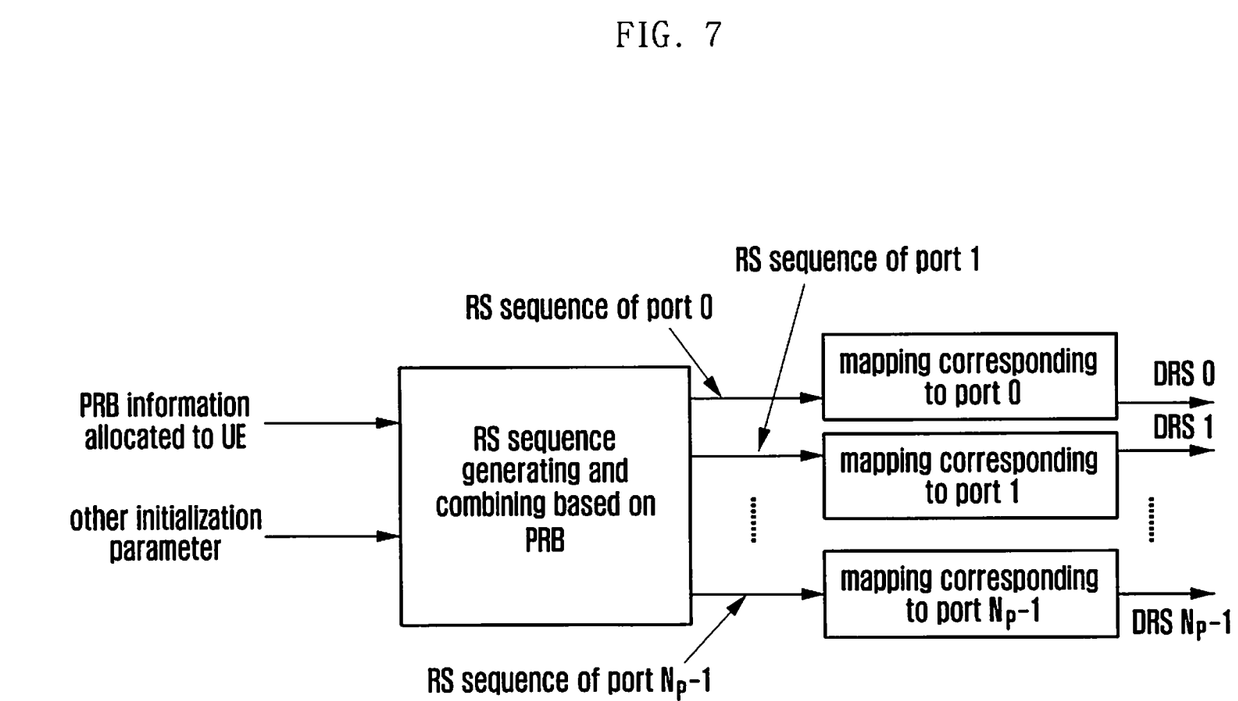
FIG. 7 illustrates a process for generating an RS sequence for a PRB according to an embodiment of the present invention.

FIG. 7 illustrates a process for generating an RS sequence for a PRB according to an embodiment of the present invention. As shown in FIG. 7, for each antenna port, the RS sequence is generated for each PRB allocated to UE by a base station. An index of the PRB allocated to the UE by the base station or a value transformed from the index of the PRB is used as an initialization parameter for generating the RS sequence. Based on this, other initialization parameters may also be used, e.g. a port ID and a time slot number. For each antenna port, RS sequences corresponding to all PRBs are combined and a desired DRS sequence is obtained.

For example, suppose the index of the PRB allocated to the UE by the base station is k, and other initialization parameters for generating the RS sequence include a cell ID $N_{ID}^{cell}$, a time slot number $n_s$ and a port ID p. An initialization value for generating the RS sequence corresponding to the PRB with the index k may be $c_{init}=2^9 \cdot (8 \cdot (\lfloor n_s/2 \rfloor +1)+p+1) \cdot (2 \cdot N_{ID}^{cell}+1)+N_{ID}^{cell}$, the RS sequence corresponding to the PRB is generated according to the initialization value $c_{init}$, the RS sequences corresponding to all PRBs are combined, and the desired DRS sequence is obtained.

It should be noted that the method for calculating the initialization value is shown by way of example, and is not used to limit the technical solution of the present invention.

In addition, when initialization values are calculated according to initialization parameters, it should be ensured as much as possible that initialization values are different, so as to generate independent pseudo-random sequences according to the different initialization values, i.e. make RS sequences of all antenna ports are independent from each other.

Specially, for a DRS structure using a CDM mode or a DRS structure jointly using a CDM mode and other multiplexing modes, in the method as shown in FIG. 4, if no scrambling operation is performed, the combining operation mentioned here may to be performed before the spreading operation, i.e. the spreading operation is performed after the RS sequences are generated for the PRBs and are combined. Alternatively, the combining operation may be performed after the spreading operation, i.e. the combining operation is performed after the RS sequences are generated for the PRBs and are spread. If the scrambling operation is performed, the combining operation mentioned here may be performed after the scrambling operation, i.e. the RS sequences are generated for the PRBs, a scrambling code is generated for the PRBs, and the RS sequences are spread, scrambled and combined.

The Second Mode

Figure 8:
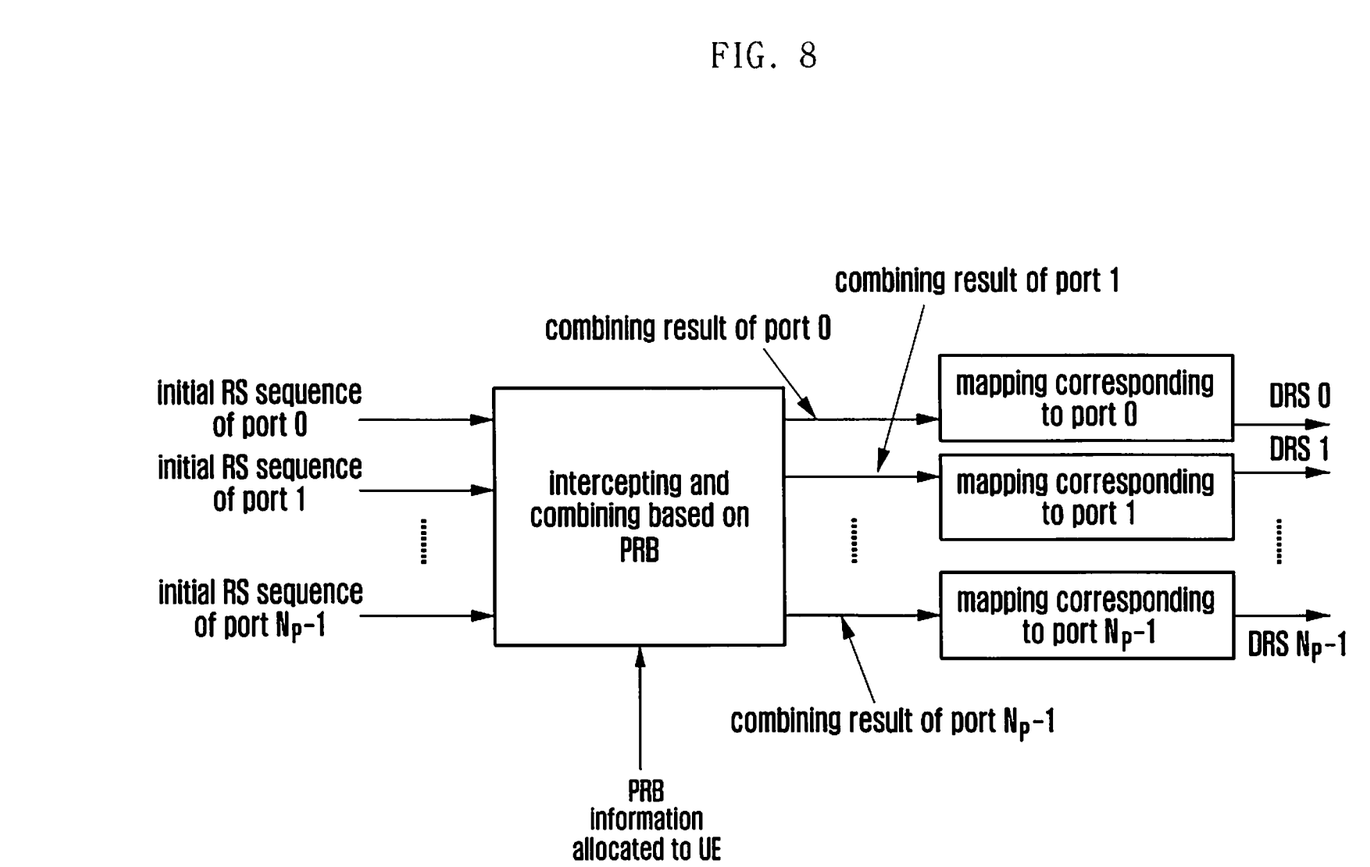
FIG. 8 illustrates an intercepting process according to an embodiment of the present invention.

FIG. 8 illustrates an intercepting process according to an embodiment of the present invention. As shown in FIG. 8, an initial DRS sequence first is generated for each antenna port, then the initial DRS sequence is intercepted according to indexes of PRBs allocated to the UE by the base station or according to values transformed from the indexes of the PRBs, to obtain DRS sequence segments. The DRS sequence segments are combined according to the indexes of the PRBs allocated to the UE by the base station or according to the values transformed from the indexes of the PRBs, to obtain the desired DRS sequence.

According to a specific arrangement structure of each element in the initial DRS sequence, DRS sequence segments corresponding to one PRB may include several continuous elements in the initial DRS sequence. The combining operation is a single concatenation operation, or the DRS sequence segments corresponding to one PRB may also include several discontinuous elements in the initial DRS sequence, The discontinuous elements need be intercepted and combined respectively. For the UE adopting time slot hopping frequency in a Physical Downlink Sharing CHannel (PDSCH), the intercepting operation is performed according to an index of a PRB in the first time slot of each subframe or a value transformed from the index of the PRB, or the intercepting operation is performed according to an index of a PRB in each time slot of each subframe or a value transformed from the index of the PRB. Generally, when local PDSCH and hopping frequency PDSCH are multiplexed, the second above-described intercepting mode is adopted.

Similarly, for the DRS structure using a CDM mode or the DRS structure jointly using a CDM mode and other multiplexing modes, in the method shown in FIG. 4 if no scrambling operation is performed, the intercepting operation and the combining operation mentioned here may be performed before the spreading operation, i.e. the spreading operation is performed after the RS sequences are generated and combined. Alternatively, the intercepting operation and the combining operation may be performed after the spreading operation, i.e. the intercepting operation and the combining operation are performed after the RS sequences are generated and spread. If the scrambling operation is performed, the intercepting operation and the combining operation mentioned here may be performed after the scrambling operation, i.e. the intercepting operation and the combining operation are performed after the RS sequences and the scrambling code are generated and the RS sequences are spread and scrambled.

The second mode is described by the following examples.

The First Example

Suppose the length of the DRS sequence in each PRB is L and corresponds to L continuous elements in the initial DRS sequence, and system bandwidth is $N_{RB}$, an initial DRS sequence with the length of $L \cdot N_{RB}$ is generated, where indexes of the elements are respectively n=0, 1, ... $L \cdot N_{RB}$−1. Suppose an index set of PRBs allocated to one UE by a base station is $K=\{k_0, k_1, \ldots, k_{N-1},\}$, where N is the number of the PRBs allocated to the UE by the base station. Indexes of elements in a DRS sequence obtained by intersecting and concatenating in the initial DRS sequence are $\{k_0L, k_0L+1, \ldots, k_0L+L-1, k_1L, k_1L+1, \ldots, k_1L+L-1, \ldots, k_{N-1}L, k_{N-1}L+1, \ldots, k_{N-1}L+L-1\}$.

The Second Example

For the DRS multiplexing structure as shown in FIG. 1, suppose the first half of elements in the initial DRS sequence are mapped to the first two columns DRS REs in each PRB to be transmitted, and the second half of elements in the initial DRS sequence are mapped to the last two columns DRS REs in each PRB to be transmitted, i.e. DRS sequence segments of one PRB are mapped to two locations in the initial DRS sequence. Suppose the length of the DRS sequence in each PRB is 2L and system bandwidth is $N_{RB}$, an initial DRS sequence with the length of $2L \cdot N_{RB}$ is generated, where indexes of the elements are respectively n=0,1, ... $2L \cdot N_{RB}$−1. Suppose an index set of PRBs allocated to one piece of UE by a base station is $K=\{k_0, k_1, \ldots, k_{N-1},\}$, where N is the number of the PRBs allocated to the UE by the base station, indexes of elements in a DRS sequence obtained by intersecting and combining in the initial DRS sequence are $\{k_0L, k_0L+1, \ldots, k_0L+L-1, k_1L, k_1L+1, \ldots, k_1L+L-1, \ldots, k_{N-1}L, k_{N-1}L+1, \ldots, k_{N-1}L+L-1,\}$ and $L \cdot N_{RB}+\{k_0L, k_0L+1, \ldots, k_0L+L-1, k_1L, k_1L+1, \ldots, k_1L+L-1, \ldots, k_{N-1}L, k_{N-1}L+1, \ldots, k_{N-1}L+L-1\}$ The Third Mode For each antenna port, one DRS sequence is generated, the length of the DRS sequence is equal to the length of a DRS sequence in one PRB, and the generated DRS sequence is unrelated to an index of a PRB allocated to the UE. The generated DRS sequence is taken as a DRS sequence corresponding to each PRB allocated to the UE by the base station, DRS sequences corresponding to all PRBs are combined, and the desired DRS sequence is obtained.

For the DRS structure using a CDM mode or the DRS structure jointly using a CDM mode and other multiplexing modes, in the method shown in FIG. 4, if no scrambling operation is performed, the combining operation mentioned here may be performed before the spreading operation, i.e. the spreading operation is performed after the RS sequences are generated for one PRB and are used to PRBs allocated by the base station. Alternatively, the combining operation may be performed after the spreading operation, i.e. the spreading operation is performed after the RS sequences are generated for one PRB, are spread and are used to PRBs allocated by the base station. If the scrambling operation is performed, the combining operation mentioned here may be performed after the scrambling operation, i.e. the combining operation is performed after the RS sequences and the scrambling code are generated for one PRB and the RS sequences are spread, scrambled and are used to PRBs allocated by the base station.

Figure 9:
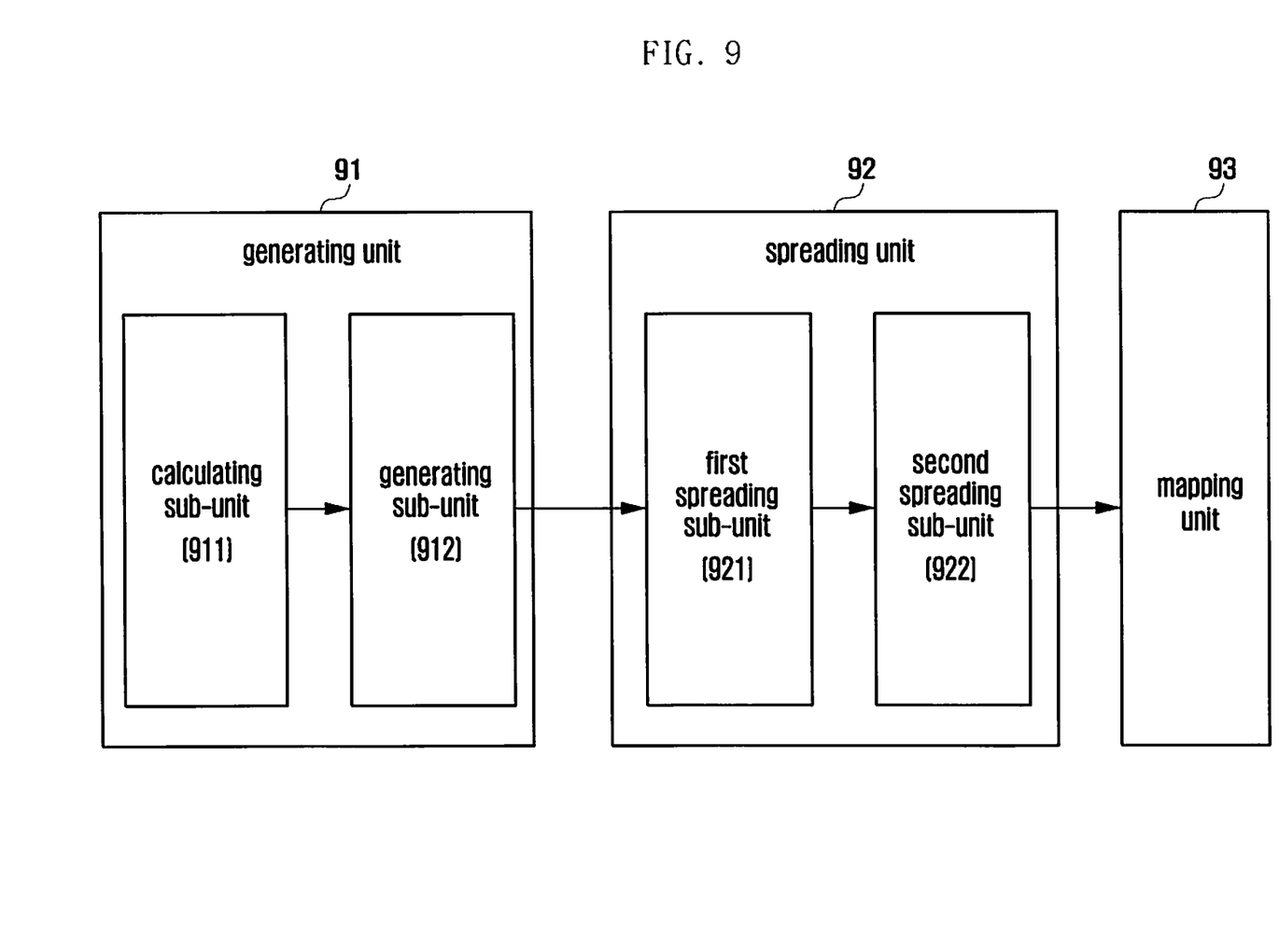
FIG. 9 illustrates the structure of an apparatus for generating a DRS to according to an embodiment of the present invention.

FIG. 9 illustrates an apparatus for generating a DRS according to an embodiment of the present invention. As shown in FIG. 9, the apparatus includes a generating unit 91, a spreading unit 92, and a mapping unit 93.

The generating unit 91 is adapted to generate an RS sequence of each antenna port; and the spreading unit 92 is adapted to spread each RS sequence, obtain an spread RS sequence, multiply each spread RS sequence by a predefined scrambling code, and obtain a desired DRS sequence. The mapping unit 93 is adapted to perform RE mapping for each DRS sequence.

The generating unit 91 includes a calculating sub-unit 911, adapted to determine an initialization parameter for generating the RS sequence, and calculate an initialization value according to the initialization parameter, and a generating sub-unit 912, adapted to generate the RS sequence of each antenna port according to the initialization value.

The spreading unit 92 includes a first spreading sub-unit 921, adapted to multiply each RS sequence by an spreading code, and perform hopping of each antenna port using a predefined spreading code, and a second spreading sub-unit 922, adapted to determine an initialization parameter for generating the scrambling code, calculate an initialization value according to the initialization parameter, generate a common scrambling code unrelated to the antenna port according to the initialization value, and multiply each spread RS sequence by the common scrambling code. Alternatively, the second spreading sub-unit 922 is adapted to determine an initialization parameter for generating the scrambling code, calculate an initialization value according to the initialization parameter, generate N scrambling codes according to the initialization value, and multiply each spread RS sequence by a scrambling code corresponding the spread RS sequence, where N is a positive integer and is equal to the number of CDM RE groups for transmitting the DRS.

The specific order of components of the apparatus shown in FIG. 9 also refers to the description in the method shown in FIG. 4, and will not be further described.

As described above, the present invention solves the problem of the imbalance of the power of OFDM symbols, and also randomizes DRS interference between different cells. In addition, the present invention optimizes the performance of MU-MIMO, and allows the UE to learn DRS sequence information of other UEs performing MU-MIMO, thereby supporting an explicit MU-MIMO transmission mode.

Although embodiments of the present invention have been described in detail hereinabove, it should be understood that many variations and modifications of the basic inventive concept herein described, which may be apparent to those skilled in the art, will still fall within the spirit and scope of the embodiments of the present invention as defined in the appended claims.

What is claimed is:

1. A method for generating a Dedicated Reference Signal (DRS) sequence in a radio communication system, comprising:
   allocating at least one Physical Resource Block (PRB) for a User Equipment (UE);
   generating an initial Reference Signal (RS) sequence using an initialization value based on a Cell Identifier (ID):
   obtaining the DRS sequence for the UE from the initial RS sequence based on an index of the at least one PRB allocated to the UE; and
   mapping the DRS sequence for the UE onto a plurality of Resource Elements (REs) based on a DRS port;
   wherein the plurality of REs comprises three RE sets in one PRB, each RE set includes two consecutive Orthogonal Frequency Division Multiplexing (OFDM) symbols in a time domain and one subcarrier in a frequency domain, one RE set is adapted to be mapped to at least two DRS ports, and the at least two DRS ports are differentiated in the RE set by applying different codes.

2. The method of claim 1, wherein a pseudo random sequence generator of the initial RS sequence is initialized by the Cell ID while a UE ID is excluded.

3. The method of claim 1, wherein the initial RS sequence is intercepted according to the index of the at least one PRB allocated to the UE to obtain DRS sequence segments, and the DRS sequence segments are combined according to the indexes of the PRBs allocated to the UE to obtain the DRS sequence.

4. The method of claim 3, wherein the DRS sequence segments related to one PRB index include continuous elements of the initial RS sequence.

5. The method of claim 3, wherein the DRS sequence segments related to one PRB index include discontinuous elements of the initial RS sequence.

6. The method of claim 1, wherein the index of the at least one PRB is allocated to the UE in a slot.

* * * * *

UNITED STATES PATENT AND TRADEMARK OFFICE
CERTIFICATE OF CORRECTION

PATENT NO. : 8,755,339 B2  Page 1 of 1
APPLICATION NO. : 12/819729
DATED : June 17, 2014
INVENTOR(S) : Yingyang Li et al.

It is certified that error appears in the above-identified patent and that said Letters Patent is hereby corrected as shown below:

On the Title Page

Item (30) Foreign Application Priority Data

"(CN) 2009 1 0146321" should be -- (CN) 2009 1 0146321.1 --

Signed and Sealed this
Second Day of December, 2014

Michelle K. Lee
*Deputy Director of the United States Patent and Trademark Office*